United States Patent
Van Der Sijde

(10) Patent No.: US 11,895,400 B2
(45) Date of Patent: Feb. 6, 2024

(54) IMAGING DEVICE WITH AN IMPROVED AUTOFOCUSING PERFORMANCE

(71) Applicant: Lumileds LLC, San Jose, CA (US)

(72) Inventor: Arjen Van Der Sijde, Eindhoven (NL)

(73) Assignee: Lumileds LLC, San Jose, CA (US)

(*) Notice: Subject to any disclaimer, the term of this patent is extended or adjusted under 35 U.S.C. 154(b) by 93 days.

(21) Appl. No.: 17/506,439

(22) Filed: Oct. 20, 2021

(65) Prior Publication Data

US 2022/0046179 A1    Feb. 10, 2022

Related U.S. Application Data

(63) Continuation of application No. 16/709,311, filed on Dec. 10, 2019, now Pat. No. 11,184,522, which is a (Continued)

(30) Foreign Application Priority Data

Mar. 13, 2017   (EP) .................................... 17160571

(51) Int. Cl.
*H04N 5/00* (2011.01)
*H04N 23/67* (2023.01)
(Continued)

(52) U.S. Cl.
CPC ........... *H04N 23/672* (2023.01); *H04N 23/55* (2023.01); *H04N 23/56* (2023.01); *G03B 11/00* (2013.01)

(58) Field of Classification Search
CPC .................. H04N 5/2355; G06T 7/521; G06T 2207/10028; G01S 7/4863
(Continued)

(56) References Cited

U.S. PATENT DOCUMENTS

| 8,379,084 B2 | 2/2013 | Hirai |
| 8,587,636 B2 | 11/2013 | Kimura |

(Continued)

FOREIGN PATENT DOCUMENTS

| CN | 102104732 A | 6/2011 |
| CN | 104583831 A | 4/2015 |

(Continued)

OTHER PUBLICATIONS

"U.S. Appl. No. 16/709,311, PTO Response to Rule 312 Communication dated Oct. 27, 2021", 2 pgs.
(Continued)

*Primary Examiner* — Jeffery A Williams
(74) *Attorney, Agent, or Firm* — Schwegman, Lundberg & Woessner, P.A.

(57) ABSTRACT

The invention describes an imaging device (1) comprising an image sensor (2), an imaging lens (3), an infrared light source (5) to illuminate a scene (SC), and an infrared autofocus system (6) for providing an autofocus function, wherein the image sensor (2) comprises an array (21) of sensor pixels each arranged as dual pixel (22) comprising two separate pixel sensors (22a, 22b) per dual pixel (22) to record the image data (D1) as a sum signal from both pixel sensors (22a, 22b) and providing infrared data (D2) as individual signals from each of the two pixel sensors (22a, 22b) for phase contrast (PC) autofocusing, wherein an infrared filter (7) arranged between an aperture (4) of the imaging device (1) and an imaging sensor (2) and is adapted to locally transmit only a portion of the infrared light (IR) to the imaging sensor (2) by comprising at least one first area (71) arranged as infrared blocking area and at least one second area (72) arranged as infrared bandpass area. The invention further relates to a method (100) to automatically focusing this device (1).

16 Claims, 5 Drawing Sheets

Related U.S. Application Data continuation of application No. 16/067,813, filed as application No. PCT/EP2018/055339 on Mar. 5, 2018, now Pat. No. 10,536,623.

(51) Int. Cl.
*H04N 23/55* (2023.01)
*H04N 23/56* (2023.01)
*G03B 11/00* (2021.01)

(58) Field of Classification Search
USPC .......................................................... 348/135
See application file for complete search history.

(56) References Cited

U.S. PATENT DOCUMENTS

| | | | |
|---|---|---|---|
| 9,377,601 | B2 | 6/2016 | Kusaka |
| 10,536,623 | B2 | 1/2020 | Van Der Sijde |
| 11,184,522 | B2 | 11/2021 | Van Der Sijde |
| 2009/0153705 | A1 | 6/2009 | Katsuda et al. |
| 2011/0242402 | A1 | 10/2011 | Wernersson |
| 2012/0236185 | A1 | 9/2012 | Ishii |
| 2014/0300749 | A1 | 10/2014 | Seo |
| 2015/0381907 | A1* | 12/2015 | Boettiger .......... H01L 27/14621 348/164 |
| 2016/0205311 | A1* | 7/2016 | Mandelli .............. H04N 25/704 348/349 |
| 2016/0353006 | A1 | 12/2016 | Andersen |
| 2017/0034456 | A1 | 2/2017 | Kyung et al. |
| 2017/0090149 | A1 | 3/2017 | Galor Gluskin et al. |
| 2017/0219749 | A1 | 8/2017 | Hou et al. |
| 2017/0264811 | A1 | 9/2017 | Ollila et al. |
| 2018/0180783 | A1* | 6/2018 | Hjelmström .......... H04N 23/56 |
| 2019/0342502 | A1 | 11/2019 | Van Der Sijde |
| 2020/0112686 | A1 | 4/2020 | Van Der Sijde et al. |

FOREIGN PATENT DOCUMENTS

| | | |
|---|---|---|
| CN | 108886571 A | 11/2018 |
| CN | 108886571 A | 11/2018 |
| CN | 108886571 B | 12/2020 |
| EP | 2889664 A1 | 7/2015 |
| EP | 3430798 A1 | 1/2019 |
| EP | 3430798 A1 | 1/2019 |
| EP | 3430798 B1 | 6/2019 |
| JP | 2009150921 A | 7/2009 |
| JP | 2010026490 A | 2/2010 |
| JP | 2012022309 A | 2/2012 |
| JP | 2013171129 A | 9/2013 |
| JP | 6547073 B2 | 6/2019 |
| JP | 2019517011 A | 6/2019 |
| JP | 2019517011 A | 6/2019 |
| KR | 20180111813 A | 10/2018 |
| KR | 101997863 B1 | 7/2019 |
| TW | 201904262 A | 1/2019 |
| WO | WO-2013125398 A1 | 8/2013 |
| WO | WO-2016092454 A1 | 6/2016 |
| WO | WO-2018166829 A1 | 9/2018 |

OTHER PUBLICATIONS

"Taiwanese Application Serial No. 107108174, Response filed Oct. 29, 2021 to Office Action dated Jul. 30, 2021", (w/ English Translation of Claims), 15 pgs.
"U.S. Appl. No. 16/067,813, Notice of Allowance dated Sep. 9, 2019", 9 pgs.
"U.S. Appl. No. 16/067,813, Preliminary Amendment filed Jul. 2, 2018", 9 pgs.
"U.S. Appl. No. 16/709,311, Non Final Office Action dated Apr. 12, 2021", 11 pgs.
"U.S. Appl. No. 16/709,311, Notice of Allowance dated Jul. 26, 2021", 8 pgs.
"U.S. Appl. No. 16/709,311, Response filed Jul. 7, 2021 to Non Final Office Action dated Apr. 12, 2021", 8 pgs.
"Canon-How Dual Pixel CMOS AF works", Juan Manuel Camerini Fotograflas, You Tube, Retrieved from the Internet: < URL:https://www.youtube.com/watch?v=lgqB6VlsiBY> [retrieved on Sep. 7, 2017], (Jul. 2, 2013), 1 pg.
"Chinese Application Serial No. 201880001323.9, First Office Action dated Mar. 23, 2020", (w/ English Translation), 8 pgs.
"Chinese Application Serial No. 201880001323.9, Office Action dated Mar. 23, 2020", w/ English Translation, 8 pgs.
"Chinese Application Serial No. 201880001323.9, Office Action dated Aug. 26, 2020", w/ English Translation, 7 pgs.
"Chinese Application Serial No. 201880001323.9, Response filed Aug. 5, 2020 to First Office Action dated Mar. 23, 2020", (w/ English Translation), 12 pgs.
"Chinese Application Serial No. 201880001323.9, Response filed Aug. 7, 2020 to Office Action dated Mar. 23, 2020", (w/ English Translation of Claims), 2 pgs.
"Chinese Application Serial No. 201880001323.9, Response filed Oct. 13, 2020 to Office Action dated Aug. 26, 2020", 11 pgs.
"Chinese Application Serial No. 201880001323.9, Response filed Oct. 13, 2020 to Second Office Action dated Aug. 26, 2020", (w/ English Translation), 16 pgs.
"Chinese Application Serial No. 201880001323.9, Second Office Action dated Aug. 26, 2020", (w/ English Translation), 7 pgs.
"European Application Serial No. 17160571.0, Amendment filed Oct. 18, 2018", 8 pgs.
"European Application Serial No. 18707391.1, Intention to Grant dated Feb. 8, 2019", 27 pgs.
"International Application Serial No. PCT/EP2018/055339, International Search Report dated May 9, 2018", 4 pgs.
"International Application Serial No. PCT/EP2018/055339, Written Opinion dated May 9, 2018", 9 pgs.
"Japanese Application Serial No. 2018-0538630, Office Action dated Apr. 16, 2019", 5 pgs.
"Japanese Application Serial No. 2018-0538630, Written Argument and Amendment filed May 13, 2019 to Office Action dated Apr. 16, 2019", (w/ English Translation), 9 pgs.
"Japanese Application Serial No. 2018-538630, Notification of Reasons for Refusal dated Apr. 16, 2019", w/ English Translation, 5 pgs.
"Japanese Application Serial No. 2018-538630, Response filed May 13, 2019 to Notification of Reasons for Refusal dated Apr. 16, 2019", 9 pgs.
"Korean Application Serial No. 10-2018-7021324, Amendment filed Mar. 21, 2019 in response to Notification dated Jan. 28, 2019", (w/ English Translation), 13 pgs.
"Korean Application Serial No. 10-2018-7021324, Decision on Grant dated Apr. 1, 2019", (w/ English Translation), 3 pgs.
"Korean Application Serial No. 10-2018-7021324, Notification dated Jan. 28, 2019", (w/ English Translation), 4 pgs.
"Taiwanese Application Serial No. 107108174, Office Action dated Jul. 30, 2021", (w/ English Translation), 7 pgs.
Fotografias, Juan Manuel Camerini, "Canon—How Dual Pixel CMOS AF works", You Tube, retrieved on Sep. 7, 2017, Retrieved from the Internet: <https://www.youtube.com/watch?v=lgqB6VlslBY>, (Jul. 2, 2013), 1 pg.

* cited by examiner

IMAGING DEVICE WITH AN IMPROVED AUTOFOCUSING PERFORMANCE

FIELD OF THE INVENTION

The invention relates to an imaging device with an improved autofocusing performance and to a method to automatically focus an imaging device.

BACKGROUND OF THE INVENTION

Due to the 3A algorithms (autofocus, auto-exposure, auto white-balancing) that are required for a well-exposed, focused and white-balanced picture, the "lead time" to take pictures can be annoyingly long (especially for moving children or animals). Since any system needs photons to work, in the dark or under low-light conditions an autofocus system may require additional light. However, a long or continuous pre-flash light is often not wanted. IR autofocus has been developed for these cases. Unfortunately, such IR autofocus systems need an additional sensor and generally work only at one or selected points of the image, rather than over the complete image. It would be desirable to obtain a compact autofocus system with a reduced number of components providing a reliable autofocus function even under low light conditions considering the complete image.

SUMMARY OF THE INVENTION

It is an object of the present invention to provide a compact autofocus system with a reduced number of components providing a reliable autofocus function even under low light conditions not limited to selected points. Autofocus systems sensitive to infrared light avoid long or continuous pre-flash light. Since any system needs photons to work, in the dark or under low-light conditions the auto focus system, is equipped with an additional light source providing a reliable autofocus function even under low light conditions.

The invention is defined by the independent claims. The dependent claims define advantageous embodiments.

According to a first aspect an imaging device is provided. The imaging device comprises an image sensor to record image data from a scene, an imaging lens arranged in a light path between an aperture of the imaging device and the image sensor, an infrared light source to illuminate the scene, and an infrared autofocus system for automatically setting the image sensor in a focus of the imaging lens, wherein the image sensor comprises an array of sensor pixels each arranged as dual pixel comprising two separate pixel sensors per dual pixel to record the image data as a sum signal from both pixel sensors by the image sensor and providing infrared data as individual signals from each of the two pixel sensors to the autofocus system for phase contrast autofocusing, wherein an infrared filter is arranged in the light path between the aperture and the imaging sensor and adapted to locally transmit only a portion of the infrared light or less along the light path to the imaging sensor.

The term "imagining device" denotes all devices suitable to record images or sequences of images on a storage device storing the image data as pictures or movies or devices comprising components being suitable to record images or sequences of images on a storage device storing the image data as pictures or movies The term "imaging lens" denotes all lenses or combinations of multiple sub-lenses forming a lens system for shaping a beam of visible and infrared light entering the imaging devices in order to record the corresponding image data resulting from the detected light of the shaped beam. The aperture denotes the opening of the imaging device where the light beam from the scene enters the imaging device to be further shaped by the imaging lens. The light beam denotes the visible and infrared light emitted or reflected from the scene. The scene denotes what shall be recorded by the imaging device.

The term "infrared light source" denotes any suitable light source providing infrared light with wavelength longer than 750 nm. The infrared light source might be arranged at any location at the housing of the imaging device suitable to illuminate the scene to be recorded by the imaging device or at a location within the optical device where optical means guide the infrared light to the outside.

The term "infrared autofocus system" denotes any kind of system being suitable to automatically control a motor of the imaging device moving the imaging lens along an optical axis of the imaging lens in order to set the imaging sensor in focus based on optical sensor data, here from light within the infrared spectrum of the light entering the imaging device through the aperture.

The image sensor is adapted to detect both, the image data from the scene to be recorded as an image or movie and the autofocus data also obtained from the scene to be used for autofocusing, comprises an array of sensor pixels. The number of sensor pixel determines the resolution under which image data can be taken. Instead of having just one sensor per pixel the image sensor according to the present invention comprises so-called dual pixels in order to integrate the image taking function as well as the autofocus function within one single image sensor. Each of the dual pixel comprise two separate pixel sensors both sensitive to visible and infrared light, where the image data result from a sum signal of both sensors of each dual pixel. The sum signal is the superposition of the detected light of each pixel sensor of each dual pixel. In contrast to that the provided autofocus signal are individual signals resulting from each sensor pixel of each dual pixel independently. From analyzing the phase contrast for both signals of each dual pixels the autofocus signal generates control signals to control the motor function in order to adjust the position of the imaging lens in order to set the image sensor in the focus of the imaging lens. The autofocus function based on phase contrast generally works with visible and/or infrared light. However in case of no visible light or too less visible light, the infrared light source of the lighting devices illuminates the scene for autofocusing purposes, where the autofocus data corresponds to infrared data and the autofocus signal corresponds to infrared signal.

The term "infrared filter" denotes a filter arranged between aperture and image sensor at any suitable position in order to locally reduce the transmission or totally block the transmission of infrared light towards the image sensor, while other parts of the infrared filter with different locations with respect to the light path through the imaging device are at least semitransparent or fully transparent for infrared light in order to illuminate at least some of the dual pixels with infrared light to generate the infrared data for focusing the imaging device. The infrared filter may have any shape suitable to at least locally reduce the transmission of infrared light, for example the infrared filter may have a circular or rectangular shape. The infrared filter might be arranged in front of the imaging lens, or in case of an imaging lens comprising multiple sub-lenses between the two of the sub-lenses, or between imaging lens and the image sensor seen in a direction along the light path from the aperture to the image sensor.

The use of the infrared filter improves significantly the quality and reliability of the autofocusing function executed by the autofocus system. Furthermore the use of one single image sensor being able to provide image data and infrared data in the same component reduced the required number of components within the imaging device, further allowing for manufacturing compact imaging devices and providing an autofocus system not being limited to selected points of the image but considering the complete image to perform the autofocus function. The infrared light source guarantees that the autofocus system is able to work reliable even at low light condition during evening or night.

The imaging device may be arranged in such a way that a lateral size of the infrared filter parallel to the imaging sensor and a location of the infrared filter are suitably adapted in order to be passed by all light directed towards the imaging sensor. This increases the phase contrast between the pixels of each dual pixel. Furthermore all dual pixels can be used to provide infrared data for focusing. The infrared transmissivity of the infrared filter might be adapted to allow for good color reproduction, where a too high overall infrared transmission lowers the color reproduction of the taken picture. The overall transmission can be lowered by decreasing the infrared transmission in case of semi-transmitting filer areas or decreasing the size of the infrared-transmissive filter areas.

The imaging device may be arranged in such a way that the infrared filter comprises at least one first area arranged as infrared blocking area and at least one second area arranged as infrared bandpass area. A suitable arrangement of the infrared blocking and transmission areas is capable to improve the phase contrast between the pixels of each dual pixel. The transmission band of the infrared bandpass area should match the emitter spectrum of the infrared light source of the imaging device. The sizes of first and second areas and the ratio of the areas of first and second areas are adapted to the application of the imaging device, where a large second area improves the autofocus accuracy and a small second area improves the color reproduction due to a lesser disturbance of the image signals. The ratio between first and second areas can be adapted in dependence of the particular imaging device and which accuracy of the autofocus function is required. Furthermore the ratio-depends on the brightness of the infrared light source, the distance between imaging device and the object reflecting the infrared light towards the imaging device and the infrared sensitivity of the image sensor.

The imaging device may be arranged in such a way that the infrared filter comprises an inner first area surrounded by the second area. In this case the infrared beams directed to both pixels of the dual pixels have a large angle of incidence resulting in a larger phase contrast improving the reliability of the autofocus function. The infrared filter may be further arranged in such a way that the second area is additionally surrounded by an outer first area. This defines more accurate the possible angle of incidence for infrared light detected by the pixel sensors of the dual pixels The imaging device may be arranged in such a way that the imaging lens has an optical axis and the inner first area is centered with respect to the optical axis. This arrangement avoids unbalanced signals due to an off-axis alignment of the image filter relative to the imaging lens.

The imaging device may be arranged in such a way that at least two separate second areas are arranged within the first area. In this case the second areas are surrounded by the first area. The shape of the second areas might be adapted to the particular imaging device and image sensor, where the shape of the different second areas might be equal or different. This arrangement decreases the total area being transmissive to infrared light in order to improve on one hand the color reproduction and on the other hand enables to locally adapt the infrared transmission to any particular shape or design of the image sensor. In an embodiment the separate second areas have a circular and/or rectangular shape. In another embodiment the total area of the second areas is smaller than 20%, preferably smaller than 10% of the first area.

The imaging device may be arranged in such a way that the at least one second area is arranged closer to an outer edge of the infrared filter as to a center of the infrared filter. In this case the infrared transmissive second areas are shifted to larger distances to the optical axis of the imaging device resulting in a larger angle of incidence of the transmitted infrared light to the sensors to improve the autofocusing accuracy.

The imaging device may be arranged in such a way that the second area is adapted to transmit infrared light within the wavelength range covering an emission maximum of the infrared light source in order to increase the signal-to-noise ratio of the resulting infrared data. Preferably a wavelength range is between 800 nm and 1000 nm.

The imaging device may be arranged in such a way that the infrared filter is fully transparent for visible light in order not to disturb the visible light to be detected by the pixel sensors to record the image data. Visible light denotes light with wavelength less than 750 nm, preferably less than 700 nm. The term fully transparent also denotes a homogeneous transparency across the infrared filter.

The imaging device may be arranged in such a way that the infrared light source is a narrow band light source emitting light with a peak wavelength between 800 nm and 1000 nm, preferably between 840 nm and 940 nm. A narrow band light source with a sharp and limited emission spectrum enables to provided a transmission band suitable to transmit the majority of the infrared light reflected from the scene formally emitted by the infrared light source to the scene to the image sensor in order to further improve the signal-to-noise ratio of the infrared data (infrared signal) from the pixel sensors of the dual pixels. A light source is denoted as narrow band light source in case of providing an emission spectrum having a full width of half maximum of 50 nm or less, e.g. between 2 nm and 50 nm.

The imaging device may be arranged in such a way that the infrared light source is a LED or VCSEL. These light sources are small and therefore compact, having long lifetimes and provide narrow band emission spectra, e.g. of less than 50 nm width.

The imaging device may be arranged in such a way that a position of the imaging lens along the light path is adapted in response to the infrared data of the imaging sensor in order to automatically setting the image sensor in the focus of the imaging lens. Here the infrared autofocus system automatically controls a motor of the imaging device moving the imaging lens along an optical axis of the imaging lens in order to set the imaging sensor in focus based on optical sensor data, here from light within the infrared spectrum of the light entering the imaging device through the aperture.

The imaging device may be arranged in such a way that the imaging device is a camera, a smartphone or a tablet PC.

According to a second aspect a method to automatically focus an imaging device according to the present invention comprising an image sensor with an array of sensor pixels, an imaging lens arranged in a light path between an aperture of the imaging device and the image sensor, an infrared light source and an infrared autofocus system, wherein the sensor pixels of the array each are arranged as dual pixel comprising two separate pixel sensors per dual pixel, is provided. The method comprises the steps of Illuminating a scene with the infrared light source;
Filtering light from the scene having passed the imaging lens by an infrared filter arranged between the imaging lens and the imaging sensor and locally transmitting only a portion of the infrared light or less along the light path to the imaging sensor;
Providing infrared data from each of the pixel sensors of the dual pixels of the image sensor as individual signals to the autofocus system for phase contrast autofocusing; and
Automatically setting the image sensor in a focus of the imaging lens in response to the autofocus system.

The method may be arranged in such a way that the method further comprises the step of recording image data from the scene by the pixel sensors of the image sensor being in focus as a sum signal for each dual pixel.

It shall be understood that a preferred embodiment of the invention can also be any combination of the dependent claims with the respective independent claim.

Further advantageous embodiments are defined below.

BRIEF DESCRIPTION OF THE DRAWINGS

These and other aspects of the invention will be apparent from and elucidated with reference to the embodiments described hereinafter.

The invention will now be described, by way of example, based on embodiments with reference to the accompanying drawings.

In the drawings:

FIG. 1 shows a principal sketch of an imaging device according to an embodiment of the present invention.

FIG. 2 shows a principal sketch of the image sensor (a) as an overview, (b) in a zoomed view showing a part of the array of sensor pixels, and (c) in a further zoomed view showing the arrangement of one sensor pixel of the array as dual pixel.

FIG. 3 shows a principal sketch of the light path in an imaging device according to the present invention when detecting the infrared data.

FIG. 4 shows a principal sketch of the light path in an imaging device according to the present invention when detecting the image data.

FIG. 5 shows different embodiments of the position of the infrared filter within an imaging device of the present invention.

FIG. 6 shows an embodiment of the infrared filter according to the present invention.

FIG. 7 shows multiple different embodiments of the infrared filter according to the present invention.

FIG. 8 shows a principal sketch of an embodiment of the method according to the present invention.

In the Figures, like numbers refer to like objects throughout. Objects in the FIGS. are not necessarily drawn to scale.

DETAILED DESCRIPTION OF EMBODIMENTS

Various embodiments of the invention will now be described by means of the Figures.

Figure 1:
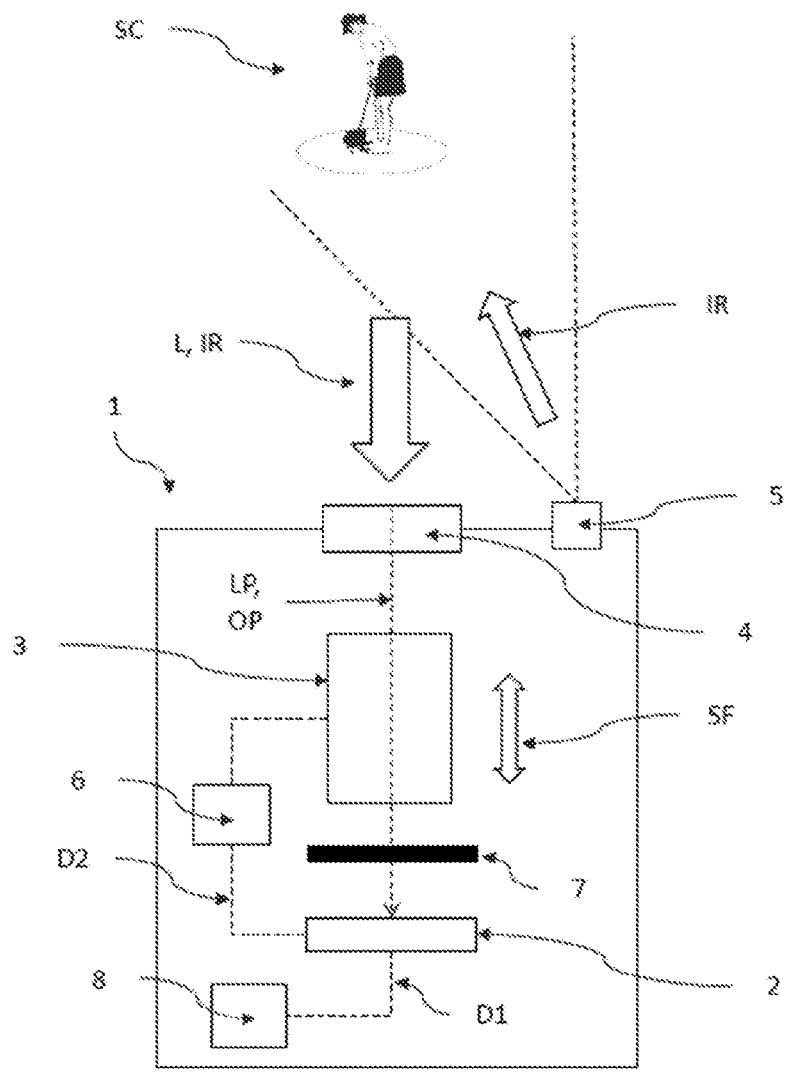

FIG. 1 shows a principal sketch of an imaging device 1 according to an embodiment of the present invention comprising an image sensor 2 to record image data D1 from a scene SC (indicated as a person in the foreground), an imaging lens 3 (here displayed as large box to indicate that the imaging lens 3 might be a lens system comprising multiple sub-lenses) arranged in a light path LP between an aperture 4 of the imaging device 1 and the image sensor 2, an infrared light source 5 to illuminate the scene SC, and an infrared autofocus system 6 for automatically setting SF the image sensor 2 in a focus of the imaging lens 3, wherein the image sensor 2 comprises an array 21 of sensor pixels each arranged as dual pixel 22 to record the image data D1 in an image data storage 8 and providing infrared data D2 to the autofocus system 6 for phase contrast PC autofocusing, wherein an infrared filter 7 is arranged in the light path LP between the aperture 4 and the imaging sensor 2, in this embodiment for example between the imaging lens 3 and the imaging sensor 2. The infrared filter 7 is adapted to locally transmit only a portion of the infrared light IR along the light path LP to the imaging sensor 2. The infrared light source 5 might be a narrow band light source emitting light with a peak wavelength between 800 nm and 1000 nm, preferably between 840 nm and 940 nm. The light emitting angle is preferably as large as possible in order to illuminate most of the scene in order to provide reflected infrared light from a as large as possible number of objects of the scene back to the image sensor 2 for autofocusing purposes of preferably the entire scene. The infrared light source 5 might be a LED or VCSEL. During autofocusing a position of the imaging lens 3 is moved along the light path LP (or optical axis of the imaging lens) in response to the infrared data D2 of the imaging sensor 2 in order to automatically setting the image sensor 2 in the focus of the imaging lens 3. The imaging device 1 shown in FIG. 1 might be a camera, a smartphone or a tablet PC.

Figure 2:
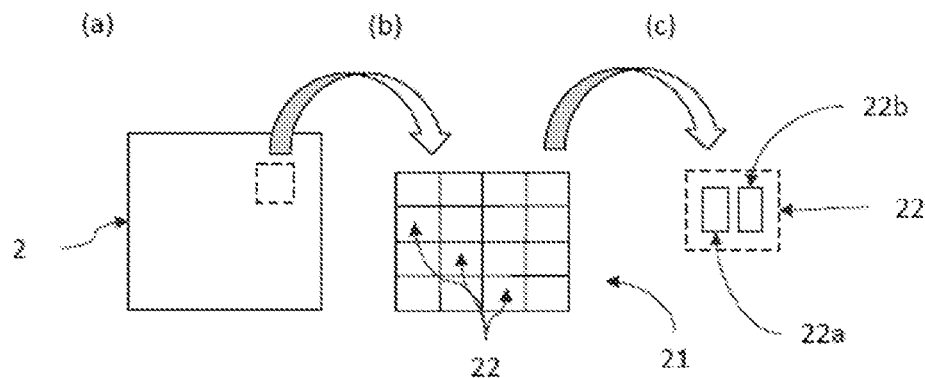

FIG. 2 shows a principal sketch of the image sensor 2 (a) as an overview, (b) in a zoomed view showing a part of the array 21 of sensor pixels, and (c) in a further zoomed view showing the arrangement of one sensor pixel 22 of the array 21 as dual pixel 22 in details. The image sensor 2 comprises an array 21 of sensor pixels each arranged as dual pixel 22 comprising two separate pixel sensors 22a, 22b per dual pixel 22 to record the image data D1 as a sum signal from both pixel sensors 22a, 22b by the image sensor 2 and providing infrared data D2 as individual signals from each of the two pixel sensors 22a, 22b to the autofocus system 6 for phase contrast PC autofocusing.

Figure 3:
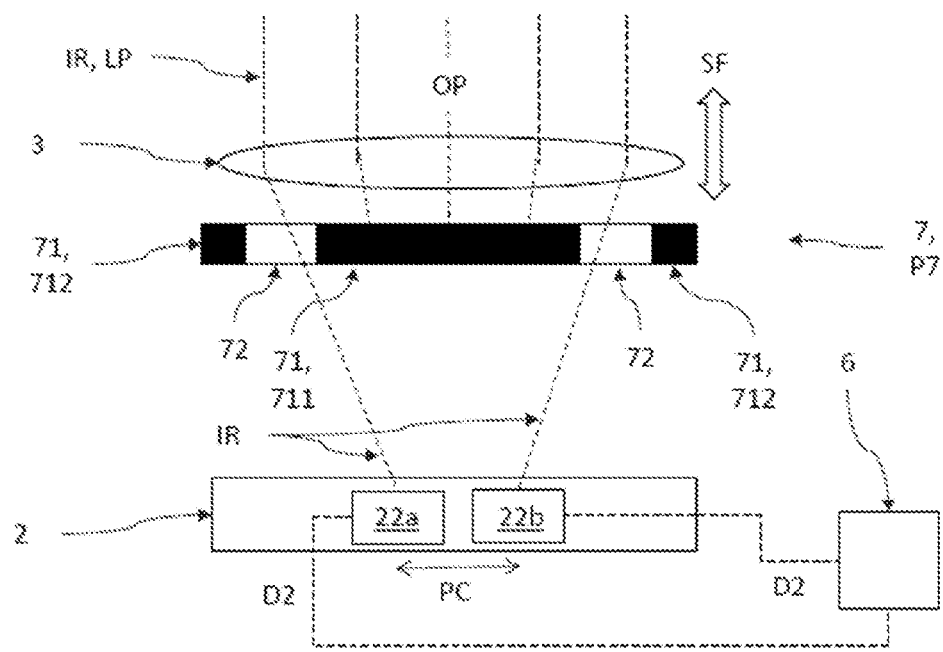
Figure 4:
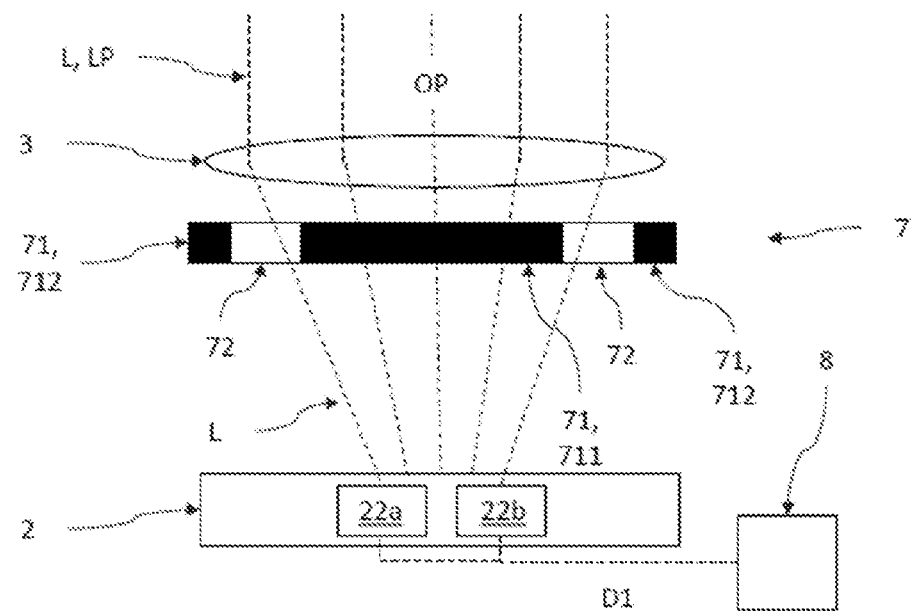

FIG. 3 shows a principal sketch of the light path LP in an imaging device 1 according to the present invention when detecting the infrared data D2. The infrared filter 7 is arranged between the imaging lens 3 and the imaging sensor 2 indicated by two pixel sensors 22a, 22b of one dual pixel 22 at a position P7. In this embodiment the infrared filter 7 comprises one first area 71 arranged as infrared blocking inner area 711 and a second area 72 arranged as infrared bandpass area outside the inner area 711, which surrounds the inner first area 711. Furthermore the second area 72 is additionally surrounded by an outer first area 712. Additionally the imaging lens 3 has an optical axis OP and the inner first area 711 is centered with respect to the optical axis OP. The second areas 72 are adapted to transmit infrared light IR (indicated by the passing dashed line) within the wavelength range covering an emission maximum of the infrared light source 5, preferably a range of 800 nm to 1000 nm. The dual pixel 22 provides infrared data D2 as individual signals D2 from each of the two pixel sensors 22a, 22b to the autofocus system 6 for phase contrast PC autofocusing. Based on the provided infrared data D2 a position of the imaging lens 3 along the light path LP is adapted SF in order to automatically setting the image sensor 2 in the focus of the imaging lens 3, where the individual signals D2 to the autofocus system 6 are analyzed according to their phase contrast PC originating from the different locations of the sensor pixels 22a, 22b. The resulting determined phase contrast PC enables the autofocusing system 6 to control the motor (not shown here) moving the imaging lens FIG. 4 shows a principal sketch of the light path LP in an imaging device 1 according to the present invention when detecting the image data D1. The infrared filter 7 located between imaging lens 3 and image sensor 2 indicated by two pixel sensors 22a, 22b of one dual pixel 22 is transparent for visible light (indicated by the passing dashed lines). The dual pixel 22 provides image data D1 as a sum signal D2 from both two pixel sensors 22a, 22b to the image data storage 8 to record the desired image after having set the image sensor 2 in the focus of the imaging lens 3 according to the procedure as shown in FIG. 3.

Figure 5:
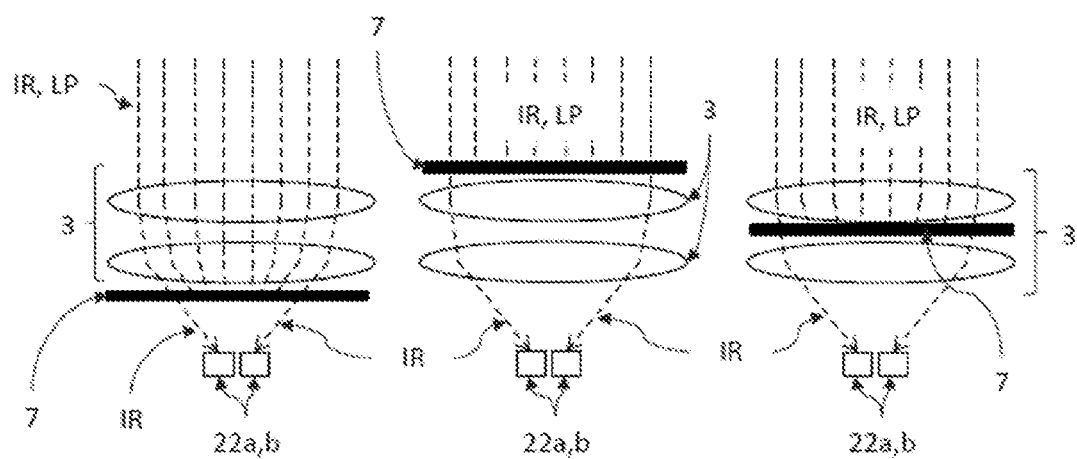

FIG. 5 shows different embodiments of the position of the infrared filter 7 within an imaging device 1 of the present invention. In this example the structure of the infrared filter 7 is the same as shown in FIG. 3 and 4. In other embodiments the structure might be different. The infrared filter 7 might be arranged between the imaging lens 3 comprising two sub-lenses and the image sensor 3 indicated by the dual pixels 22a, b (left part of FIG. 5). In another embodiment the infrared filter 7 might be arranged in front of the imaging lens 3 seen in direction from the aperture towards the image sensor. (central part of FIG. 5). In another embodiment the infrared filter 7 might be arranged within the imaging lens between both sub-lenses (right part of FIG. 5). In all these different locations the infrared filter will provide the same effect in accordance to the present invention as described above.

Figure 6:
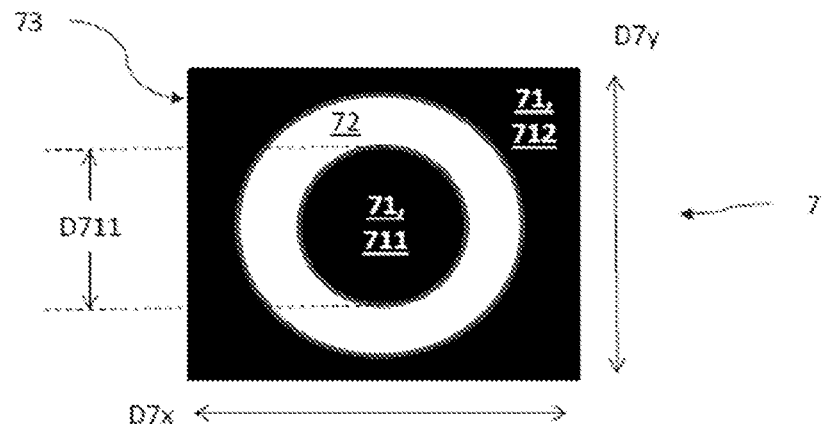

FIG. 6 shows an embodiment of the infrared filter 7 according to the present invention in a top view directed towards the image sensor 2 (not shown here). The infrared filter 7 comprises two first areas 71, an inner first area 711 and an outer first are 712, arranged as infrared blocking areas and one second area 72 arranged as infrared bandpass area, where the inner first area 711 is surrounded by the second area 72 and the second area 72 is additionally surrounded by an outer first area 712. The lateral size D7x, D7y denotes the size of the infrared filter 7 parallel to the imaging sensor 2 which is suitably adapted in order to be passed by all light L, IR directed towards the imaging sensor 2. In this embodiment the second area 72 has a ring-shape surrounding inner first area 711 being circular shaped, where inner the first area 711 has a first diameter D711 adapted to cover at least 70% of the light path LP provided by the imaging lens 3.

Figure 7:
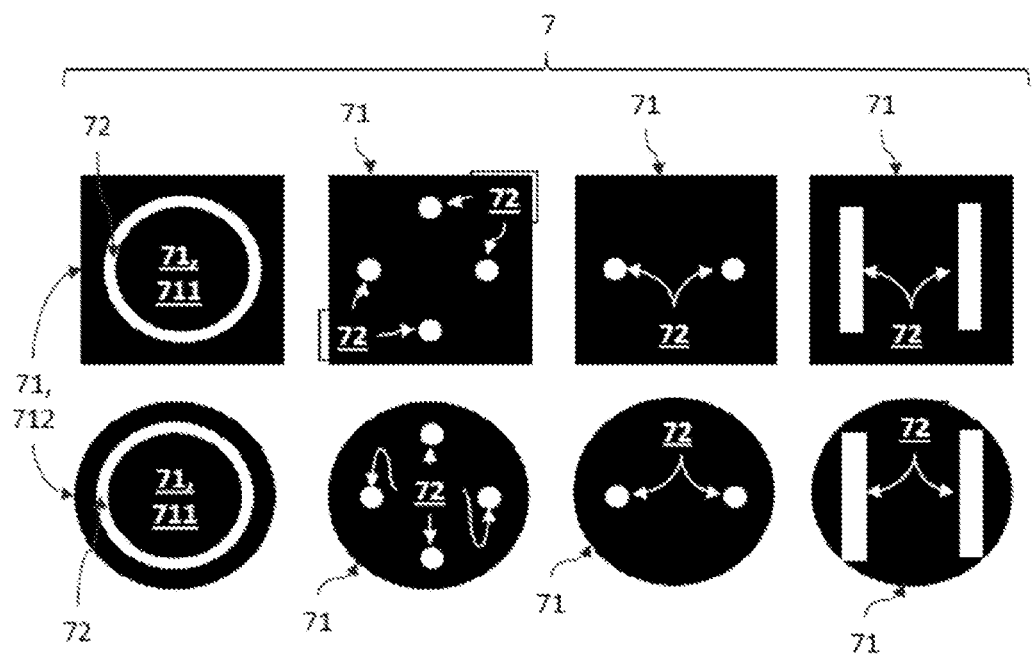

FIG. 7 shows multiple different embodiments of the infrared filter 7 according to the present invention, where the infrared filter 7 comprises at least one first area 71 arranged as infrared blocking area and at least one second area 72 arranged as infrared bandpass area. The upper four embodiments show infrared filters 7 with a square shape, while the lower four embodiments show infrared filters 7 with circular shape. The upper left embodiment corresponds to the infrared filter 7 according to FIG. 6, where the lower left embodiment shows a similar structure, where the infrared filter 7 is a circular filter. In these both embodiments the infrared filter comprises 7 an inner first area 711 surrounded by the second area 72, wherein the second area 72 is additionally surrounded by an outer first area 712. All other embodiments relate to infrared filters 7 where two or four separate second areas 72 are arranged within the first area 71 surrounding the separate second areas 72. The right upper and lower embodiments comprise separate second areas 72 having a rectangular shape instead of a circular shape. Furthermore the second areas are arranged closer to an outer edge 73 (see FIG. 6) of the infrared filter 7 as to a center of the infrared filter 7.

Figure 8:
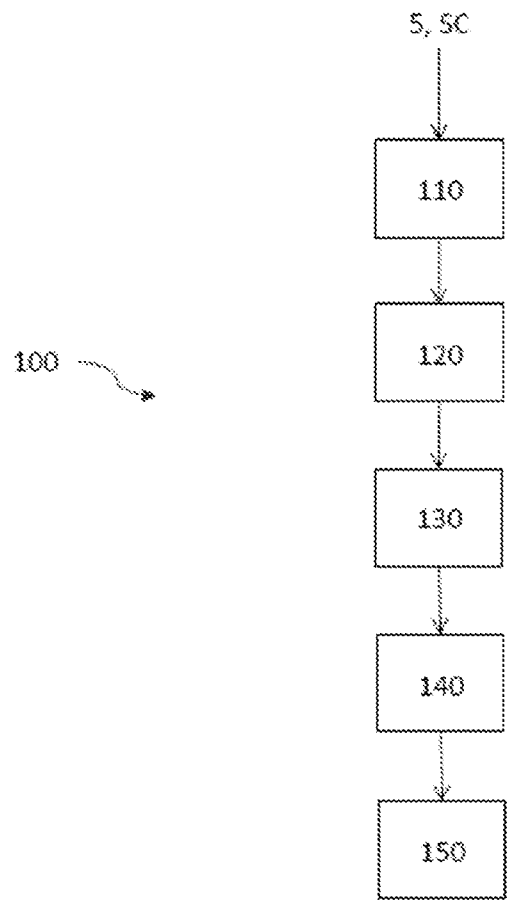

FIG. 8 shows a principal sketch of an embodiment of the method according to the present invention to automatically focus an imaging device 1 in accordance with the present invention comprising an image sensor 2 with an array 21 of sensor pixels, an imaging lens 3 arranged in a light path LP between an aperture 4 of the imaging device 1 and the image sensor 3, an infrared light source 5 and an infrared autofocus system 6, wherein the sensor pixels of the array 21 each are arranged as dual pixel 22 comprising two separate pixel sensors 22a, 22b per dual pixel 22 comprising the steps of illuminating 110 a scene SC with the infrared light source 5; filtering 120 light from the scene SC having passed the imaging lens 3 by an infrared filter 7 arranged between the imaging lens 3 and the imaging sensor 2 and locally transmitting only a portion of the infrared light IR along the light path LP to the imaging sensor 2; providing 130 infrared data D2 from each of the pixel sensors 22a, 22b of the dual pixels 22 of the image sensor 2 as individual signals to the autofocus system 6 for phase contrast PC autofocusing; and automatically setting 140 the image sensor 2 in a focus of the imaging lens 2 in response to the autofocus system 6. In case of a set autofocus the method 100 may further comprises the step of recording 150 image data D1 from the scene SC by the pixel sensors 22a, 22b of the image sensor 2 being in focus as a sum signal for each dual pixel 22.

While the invention has been illustrated and described in detail in the drawings and the foregoing description, such illustration and description are to be considered illustrative or exemplary and not restrictive.

From reading the present disclosure, other modifications will be apparent to persons skilled in the art. Such modifications may involve other features which are already known in the art and which may be used instead of or in addition to features already described herein.

Variations to the disclosed embodiments can be understood and effected by those skilled in the art, from a study of the drawings, the disclosure and the appended claims. In the claims, the word "comprising" does not exclude other elements or steps, and the indefinite article "a" or "an" does not exclude a plurality of elements or steps. The mere fact that certain measures are recited in mutually different dependent claims does not indicate that a combination of these measures cannot be used to advantage.

Any reference signs in the claims should not be construed as limiting the scope thereof.

LIST OF REFERENCE NUMERALS

1 Imaging device according to the present invention
2 Image sensor of the imaging device
21 array of sensor pixels
22 dual pixel
22a, 22b separate pixel sensors of each dual pixel
3 Imaging lens of the imaging device
4 Aperture of the imaging device
5 Infrared light source of the imaging device (e.g. VCSEL, LED)
6 autofocus system of the imaging device 7 infrared filter of the imaging device
71 first area
711 inner first area
712 outer first area
72 second area
73 outer edge of the infrared filter
8 image data storage
100 method
110 Illuminating a scene with the infrared light source
120 Filtering light from the scene having passed the imaging lens
130 Providing infrared data to the autofocus system
140 Automatically setting the image sensor in a focus of the imaging lens
150 Recording image data from the scene
D1 image data
D2 infrared data
D7x, D7y lateral size of the filter parallel to the image sensor
D711 first diameter of the inner first area
IR infrared light
L light
LP light path
OP optical axis of the imaging lens
P7 location of the infrared filter
PC phase contrast autofocusing
SC Scene
SF moving the imaging lens to automatically setting the image sensor in focus

What is claimed:

1. An imaging device, comprising:
a filter configured to partially attenuate infrared light reflected from a scene, the filter including a first area that is substantially transparent to infrared light and substantially transparent to visible light, the first area including a plurality of subareas that do not adjoin one another, the filter including a second area that is substantially opaque to infrared light and substantially transparent to visible light; and
an imaging lens configured to form the image of the scene using the infrared light reflected from the scene and using visible light that is reflected from the scene or emitted by the scene, the imaging lens defining a central axis that extends through the second area of the filter, the subareas being equidistant from the central axis.

2. The imaging device of claim 1, wherein the filter is positioned between the imaging lens and the scene.

3. The imaging device of claim 1, wherein the second area of the filter is centered with respect to the central axis.

4. The imaging device of claim 1, wherein the first area of the filter extends around the central axis.

5. The imaging device of claim 1, further comprising a detector positioned to detect the image, the detector including a plurality of detector pixels, the plurality of detector pixels including at least two pixels configured to produce signals that are summed together to produce data representing a single area within the image.

6. The imaging device of claim 5, wherein the filter is positioned between the imaging lens and the detector.

7. The imaging device of claim 5, wherein the detector includes detector pixels that are grouped into pairs, each pair of detector pixels configured to produce signals that are summed together to produce data representing the single area within the image.

8. The imaging device of claim 5, wherein the detector pixels are sensitive to both the infrared light and the visible light.

9. The imaging device of claim 5, further comprising an autofocus motor configured to adjust a spacing between the imaging lens and the detector such that the image is formed in a plane of the detector, the autofocus motor configured to adjust the spacing in response to an autofocus signal generated by the detector.

10. The imaging device of claim 9, wherein the autofocus signal is generated via phase contrast at the detector.

11. The imaging device of claim 1, further comprising a light source configured to illuminate the scene with the infrared light.

12. A method for operating an image device, the method comprising:
receiving infrared light reflected from a scene;
partially attenuating the infrared light with a filter, the filter including a first area that is substantially transparent to infrared light and substantially transparent to visible light, the first area including a plurality of subareas that do not adjoin one another, the filter including a second area that is substantially opaque to infrared light and substantially transparent to visible light; and
forming an image of the scene using the infrared light and visible light that is reflected from the scene or emitted by the scene, the image being formed with an imaging lens that defines a central axis that extends through the second area of the filter, the subareas being equidistant from the central axis.

13. The method of claim 12, further comprising:
detecting the image with a detector, the detector including a plurality of detector pixels, the plurality of detector pixels including at least two pixels that are summed together to produce data representing a single pixel of the image.

14. The method of claim 13, wherein the detector includes detector pixels that are grouped into pairs, each pair of detector pixels configured to produce signals that are summed together to produce data representing a single pixel of the image.

15. The method of claim 14, further comprising:
adjusting, with an autofocus motor, a spacing between the imaging lens and the detector such that the image is formed in a plane of the detector, the autofocus motor adjusting the spacing in response to an autofocus signal generated by the detector, the autofocus signal being generated using data from each pixel individually in each pair of detector pixels, the autofocus signal being generated via phase contrast at the detector.

16. An imaging device, comprising:
an imaging lens configured to form an image of a scene using infrared light reflected from the scene and visible light that is reflected from the scene or emitted by the scene;
a filter configured to partially attenuate the infrared light reflected from the scene, the filter including a first area that is substantially transparent to infrared light and substantially transparent to visible light, the first area includes a plurality of subareas that do not adjoin one another, the filter further including a second area that is substantially opaque to infrared light and substantially transparent to visible light, each subarea being surrounded by the second area, the imaging lens defining a central axis that extends through the second area of the filter, the subareas being equidistant from the central axis;

a detector positioned to detect the image, the detector including detector pixels that are grouped into pairs, each pair of detector pixels configured to produce signals that are summed together to produce data representing a single pixel of the image; and an autofocus motor configured to adjust a spacing between the imaging lens and the detector such that the image is formed in a plane of the detector, the autofocus motor configured to adjust the spacing in response to an autofocus signal generated via phase contrast at the detector, the autofocus signal being generated using data from each pixel individually in each pair of detector pixels.

* * * * *